(12) United States Patent
Yang et al.

(10) Patent No.: US 8,310,454 B2
(45) Date of Patent: *Nov. 13, 2012

(54) TRANSLUCENT TOUCH SCREENS INCLUDING INVISIBLE ELECTRONIC COMPONENT CONNECTIONS

(75) Inventors: Jung Sik Yang, Gurnee, IL (US); Amit Kaistha, Skokie, IL (US); Chan Woo Park, Grayslake, IL (US); Matthew B. Wienke, Highland Park, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1119 days.

This patent is subject to a terminal disclaimer.

(21) Appl. No.: 11/962,531

(22) Filed: Dec. 21, 2007

(65) Prior Publication Data

US 2009/0160783 A1 Jun. 25, 2009

(51) Int. Cl.
*G06F 3/041* (2006.01)
(52) U.S. Cl. .................................. 345/173; 178/18.06
(58) Field of Classification Search .......... 345/173–178; 178/18.01–18.08
See application file for complete search history.

(56) References Cited

U.S. PATENT DOCUMENTS

| | | | | |
|---|---|---|---|---|
| 4,893,115 A | * | 1/1990 | Blanchard | 345/174 |
| 6,453,045 B1 | | 9/2002 | Zurek et al. | |
| 6,622,174 B1 | * | 9/2003 | Ukita et al. | 709/246 |
| 6,636,203 B1 | * | 10/2003 | Wong et al. | 345/173 |
| 6,670,949 B1 | * | 12/2003 | Ahn et al. | 345/173 |
| 2001/0018809 A1 | * | 9/2001 | Heropoulos et al. | 40/544 |
| 2001/0034229 A1 | | 10/2001 | Park et al. | |
| 2005/0043056 A1 | * | 2/2005 | Boesen | 455/550.1 |
| 2005/0083307 A1 | * | 4/2005 | Aufderheide et al. | 345/173 |
| 2005/0156906 A1 | | 7/2005 | Chiu et al. | |
| 2005/0243069 A1 | | 11/2005 | Yorio et al. | |
| 2005/0270273 A1 | | 12/2005 | Marten | |
| 2007/0046642 A1 | | 3/2007 | Lee et al. | |
| 2007/0075965 A1 | * | 4/2007 | Huppi et al. | 345/156 |

(Continued)

FOREIGN PATENT DOCUMENTS

CN 2475081 Y 1/2002

(Continued)

OTHER PUBLICATIONS

"Touch Screen and Touch window embody Nissha's extensive technology capability", Nissha Printing Co., Ltd. Touch Input, http://www.nissha.co.jp/english/product/touch/index.html, one page, dated Dec. 19, 2007.

(Continued)

*Primary Examiner* — Amare Mengistu
*Assistant Examiner* — Vinh Lam

(57) ABSTRACT

Disclosed is a touch screen of semi-transparent mesh that may be utilized by, for example, a mobile communication device. The mesh may be utilized for both a touch screen and an electrical circuit for an electronic component attached to it. That is, the mesh may be in part a touch screen, and in part an electrical circuit. The touch surface includes mesh composed of a conductive material configured to provide input signals from activation points of the touch surface to the control circuit of the device. The mesh of a conductive material also includes an electrical circuit configured to provide audio signals from the control circuit of the device to the speaker. Since the disclosed semi-transparent mesh acts an electrical circuit, artwork to hide electrical circuits from the electronic component to the controller is not necessary. A switchable ground eliminates interference between the touch screen and the electrical circuit.

8 Claims, 3 Drawing Sheets

U.S. PATENT DOCUMENTS

2007/0164923 A1 7/2007 Kanai et al.
2007/0236618 A1* 10/2007 Maag et al. .................... 349/12

FOREIGN PATENT DOCUMENTS

| EP | 1585018 A2 | 10/2005 |
| EP | 1827057 A2 | 12/2006 |
| JP | 200639485 A | 2/2006 |
| JP | 2006344163 A | 12/2006 |

OTHER PUBLICATIONS

Motoming A1200, http://www.motorola.com/consumer/v/index, one page, dated Dec. 19, 2007.
The Intellectual Property Office of the People's Republic of Chin, "First Office Action" for Chinese Patent Application No. 200880122039.3, dated Jan. 4, 2012, 18 pages.
European Patent Office "Extended Search Report" for European Patent Application No. 08866910.6, dated May 14, 2012, 9 pages.

* cited by examiner

TRANSLUCENT TOUCH SCREENS INCLUDING INVISIBLE ELECTRONIC COMPONENT CONNECTIONS

CROSS REFERENCE TO RELATED APPLICATIONS

This application is related to co-pending U.S. patent application Ser. No. 11/962,505, "Translucent Touch Screen Devices Including Low Resistive Mesh", filed Dec. 21, 2007, and to co-pending U.S. patent application Ser. No. 11/962,466, "Translucent Single Layer Touch Screen Devices Having Vertically Oriented Pattern Traces", filed Dec. 21, 2007, both of which are incorporated by reference herein in their entirety.

FIELD

Disclosed are devices for touch input and methods for forming devices for touch input, and more particularly, translucent touch screen devices including invisible electronic component connections and methods for forming the same.

BACKGROUND

Mobile communication devices are a part of everyday life. Users may have more than one mobile communication device, and may trade in models yearly to own those with current design trends and up-to-date functionality. Manufacturers are constantly striving to include advanced features in their mobile communication devices as well as maintain a design edge. While there is a trend toward the inclusion of more features and improvements for current features, there is also a design trend toward smaller mobile communication devices. It would be desirable while providing advanced features and maintaining an edge in design trends, to also make improvements to reduce manufacturing costs.

A popular design trend is the translucent touch screen. In for example a clam shell form factor device, a substantially transparent touch screen may be included on the flip of the device. The main display on the main housing may be viewed through the touch screen of the flip so that a user may utilize menus of the main display without placing the clam shell device in the open position. For example, the translucent touch screen may include discrete buttons or touch zones which when touched are responsive to indicia on the main display.

Indium tin oxide (ITO) which forms a glass-like film has been utilized for semi-transparent capacitive touch screens. In translucent ITO touch screens, patterns are formed to provide activation points or zones on the touch screen. Typically, opaque silver ink is used to form signal traces from the activation zones to a printed circuit board (PCB) or other circuitry component linked to the controller of the device. For example, a set of touch zones may be formed by a pattern of ITO areas, separated one from another to isolate the zones from one another. Typically, terminal ends of the pattern traces are coupled to a PCB by silver ink signal traces applied by adhesion. An electronic component such as a speaker is also attached to the touch screen by adhesion. Its leads connected to the PCB by silver ink signal traces are also applied by adhesion. The opacity of the silver ink can detract from the translucent look of the touch screen, and often the silver ink may therefore be concealed by artwork. While semi-transparent touch screens made using ITO are gaining popularity, improvements in semi-transparent touch screens are desirable.

BRIEF DESCRIPTIONS OF THE DRAWINGS

DETAILED DESCRIPTION

Figure 1:
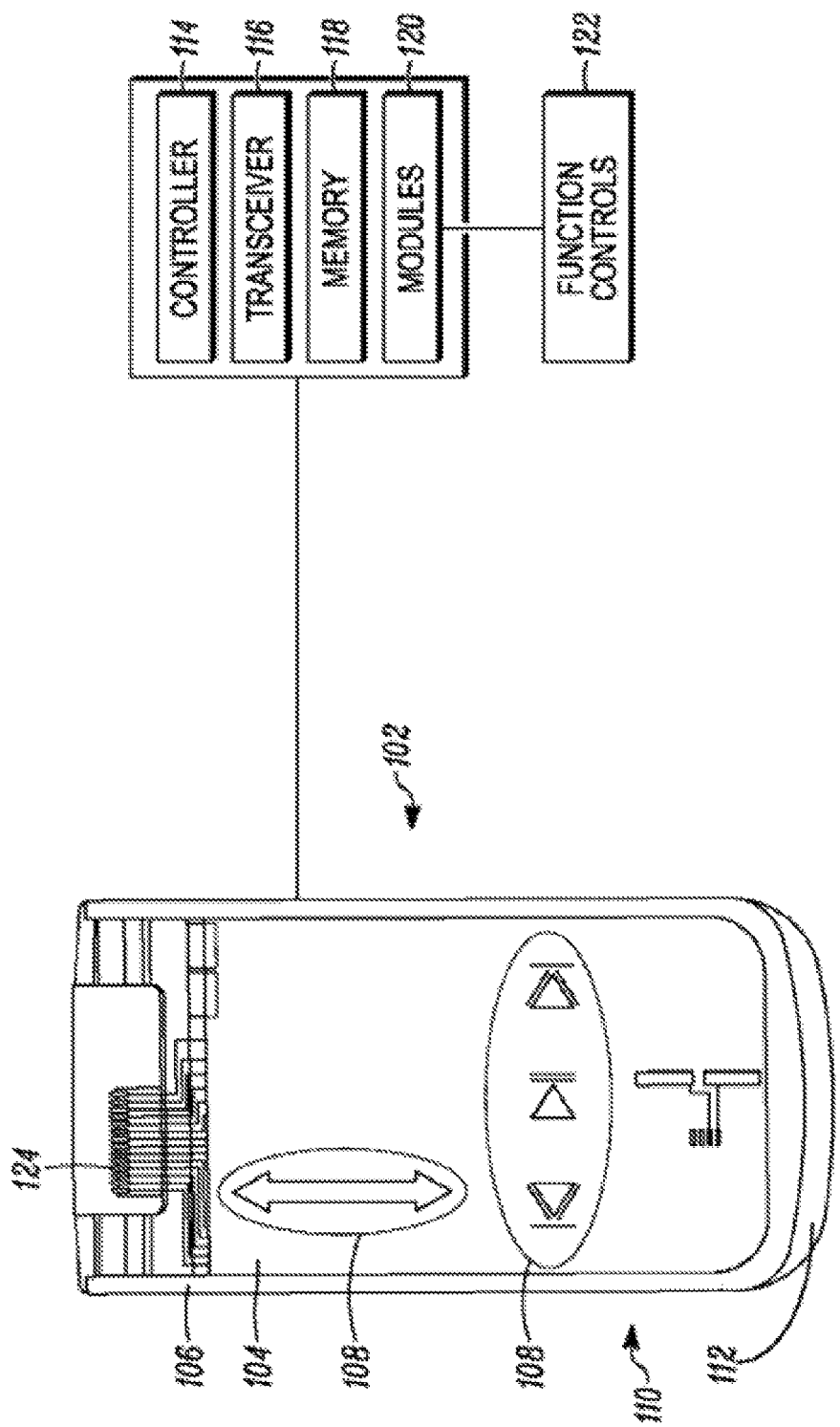
FIG. 1 depicts a mobile communication device having a clam shell form factor, where the disclosed semi-transparent, or translucent touch screen device is incorporated into the flip, and indicia on the main display of the main housing are visible through the disclosed touch screen, and a speaker is incorporated onto the flip.

Disclosed is a translucent touch screen device of a mesh composed of a low resistive material, and a method for forming a touch screen and applying components to the touch screen according to a heat based process. More particularly, the disclosed touch screen includes a mesh composed of a low resistive material, such as copper, having pattern traces formed in the mesh, the pattern traces configured to receive input to generate touch signals. The low resistivity of the mesh beneficially allows pattern traces to be of a smaller width than that of the glass-like ITO, and therefore allows more touch zones per specified area than are possible with ITO.

The touch screen utilizing a low resistive material such as copper can be semi-transparent and used in the same way as an ITO touch screen. For example, the presently described touch screen may be used in a flip of a clam shell form factor mobile communication device having circuitry to receive touch signals to control at least one function of the mobile communication device incorporating the touch screen device. The main display on the main housing may be viewed through the touch screen of the flip so that a user may utilize menus of the main display without placing the clam shell device in the open position.

It would be beneficial to make a semi-transparent touch screen more aesthetically pleasing by substantially invisibly attaching to a mesh an electrical circuit of an electronic component, and therefore, obviating a need for artwork to cover electrical connections. It would be further beneficial were the electronic component a speaker that appears to be floating on the semi-transparent flip providing advanced features of the semi-transparent flip and maintaining an edge in design trends. It would also be beneficial if a method for forming a touch screen and applying components to the touch screen were, at least in part, according to a heat based process in place of an adhesion process.

Disclosed is a touch screen of mesh that may be utilized by, for example, a mobile communication device. The mesh may be utilized for both a touch screen and an electrical circuit for an electronic component attached to it. That is, the mesh may be in part a touch screen, and in part an electrical circuit. The touch surface includes mesh composed of a conductive material configured to provide input signals from activation points of the touch surface to the control circuit of the device. The mesh also includes an electrical circuit configured to provide audio signals from the control circuit of the device to the speaker. Since the disclosed mesh acts an electrical circuit, an electronic component attached to a mesh has no visible electrical connections, and therefore, obviating the need for artwork to hide electrical circuits from the electronic component to the controller. Since the mesh is semi-transparent, the electrical connections of a component attached to the mesh appear invisible which makes a semi-transparent touch screen more aesthetically pleasing.

An electronic component, such as speaker may be attached to the touch screen. In a flip device, a speaker may be utilized by a user when the flip is in the open position. Accordingly, if the electrical connections of a component attached to the mesh appeared invisible, the speaker component on the inside of the flip and possibly a medallion attached to the outside, could be given the illusion of floating on the flip.

The touch screen utilizing a mesh of a low resistive material such as copper can be semi-transparent and used in the same way as an ITO touch screen. Attachment of circuitry and components to an ITO touch screen is an adhesion process because an ITO touch screen cannot withstand time saving heat processing. In particular, the silver ink traces of a translucent touch screen utilizing ITO are not capable of withstanding molding. However, the mesh of a low resistive material, beneficially, is capable of withstanding molding. Therefore, the processes for forming the touch screen and attaching the electronic component and its leads to the mesh may beneficially include heat processes such as molding and lamination. Heat processes can include less processing time than for example, forming a product by an adhesion process.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

FIG. 1 depicts a mobile communication device 102 having a clam shell form factor, where the disclosed semi-transparent, or translucent touch screen device 104 is incorporated into the flip 106 and indicia 108 on the main display 110 of the main housing 112 is visible through the disclosed touch screen 104, and a speaker 126 incorporated on the flip 106. While the disclosed touch screen is discussed with respect to utilization in a mobile communication device having a clam shell form factor flip housing, it is understood that the disclosed touch screen device may be used in conjunction with a slider form factor and a rotator form factor. It is further understood that the disclosed touch screen may be utilized in any suitable electronic device, and the present discussion is not intended to limit its many possible uses.

The mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The mobile communication device 102 can include a controller 114, at least one transceiver 116, a memory 118 and modules 120, for example function control modules 122, and in particular a grounding switch module 166. The modules can carry out certain processes of the methods as described herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below. In the embodiment depicted in FIG. 1, the function control module is generalized to control any designated function of the mobile communication device 102.

Visually suppressed mesh patterns for capacitive touch sensor buttons (depicted in FIG. 3) are touch zones that are utilized to process touch input. For example, touch input includes the touch of a user's finger or of a conductive stylus. Circuitry 124 may receive touch signals, the circuitry 124 being coupled to the controller 114 via a flex tail 123 to control at least one function 122 of the electronic device 102 incorporating the touch screen device 104 according to the touch signals.

Figure 2:
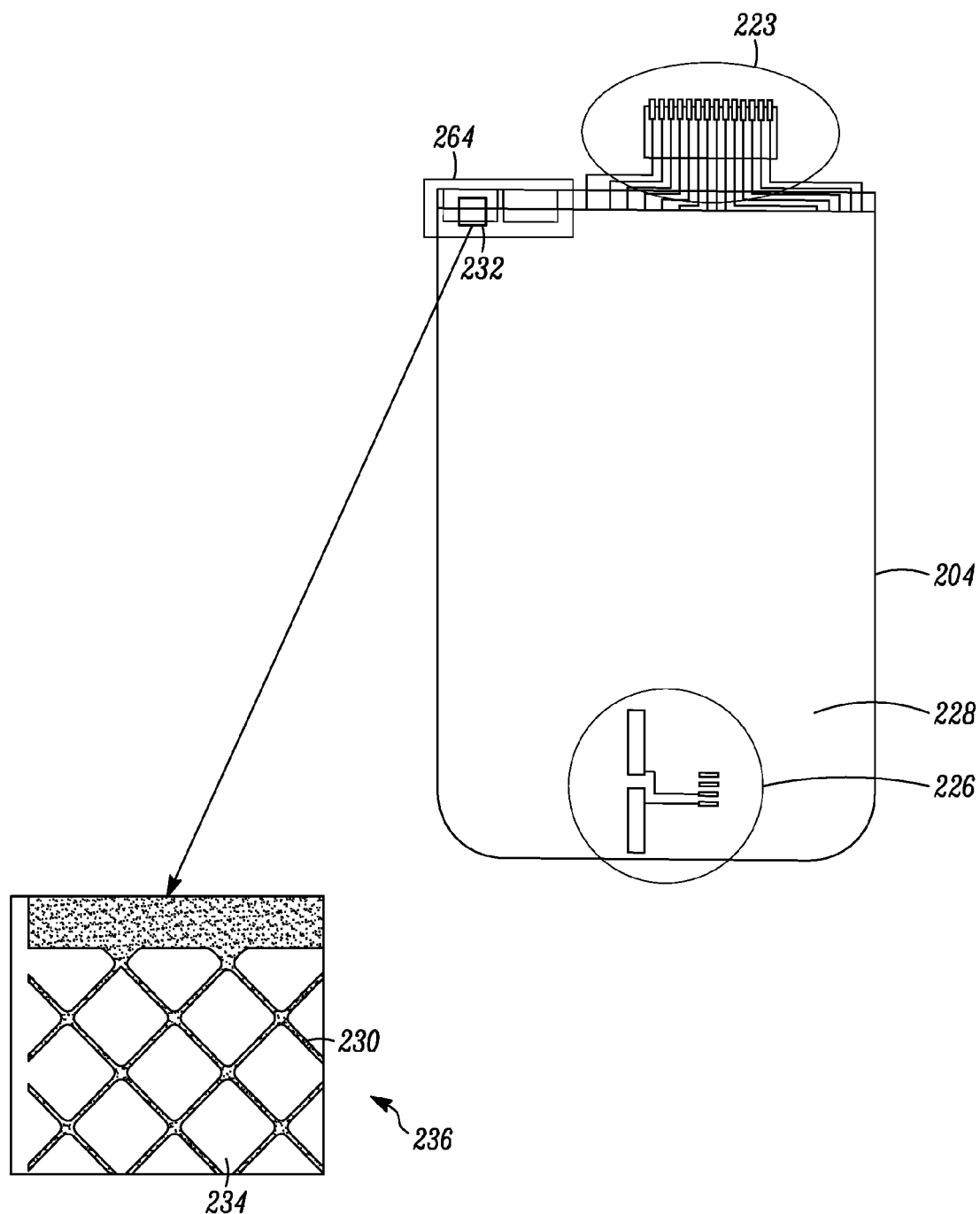
FIG. 2 depicts the disclosed mesh of a low resistive material utilized for the disclosed touch screen shown as an enlargement thereof.

An electronic component 126, and more particularly a speaker or audio output component is attached to the mesh (230, see FIG. 2). As mentioned above, a heat process, such as inmold labeling technology, may be applied to form a clear clam shell form factor flip housing. An electronic component 126 such as a speaker may be applied to the mesh also by a heat process. The terminal pads on the mesh-film and plastic combination are, for example, attached to the circuit board by adhesion. This circuit board is then attached to leads of the electronic component 126, for example, by soldering them to the mesh 230.

The electronic component 126 has a surface area and has leads (not shown), wherein at least a portion of the mesh-film an plastic combination is configured as the electrical circuit (see FIG. 3) and is coupled to the leads of the electronic component 126 within a first area defined by the surface area of the electronic component 126 so that a second area 128 defined outside the surface area of the electronic component 126 is substantially transparent, that is free of any artwork that would cover unsightly circuit leads. Since the mesh is semi-transparent, the electrical connections of a component attached to the mesh appear invisible which makes a semi-transparent touch screen more aesthetically pleasing. In this way, the electronic component or speaker to appears to be floating on the semi-transparent flip, thus maintaining an edge in design trends.

FIG. 2 depicts the disclosed mesh 230 of a low resistive material utilized for the disclosed touch screen 204 shown as an enlargement 232 of thereof. The mesh 230 is shown with a bias direction of the mesh parallel to the horizontal and vertical directions. The mesh 230 may be formed, for example, through printing, masking and a blackening process.

As mentioned above, the mesh 230 may be of a conductive material having a low resistivity value, and in particular less than about 3.0 ohms per $mm^2$. Any such material that may be configurable as a mesh, such as copper, silver, gold and alloys thereof, may be utilized. Dimensions of the mesh 230 may be, for example, about 300 μm pitch, 10 μm width and 12.5 μm thickness. It is understood that any suitable material may be used for the mesh 230 so that it has a low resistivity value. The low resistivity value provides that the pattern traces formed in the mesh 230 may be narrower than those of pattern traces of the glass-like ITO material, the pattern traces configured to receive input to generate touch signals. Accordingly, substantially more than eight touch zones may be formed on an average sized flip of a clam shell form factor mobile communication device (see FIG. 3 for touch zones). Therefore, the functionality of the disclosed device with the flip in the closed position is improved over that of an ITO touch screen.

Figure 3:
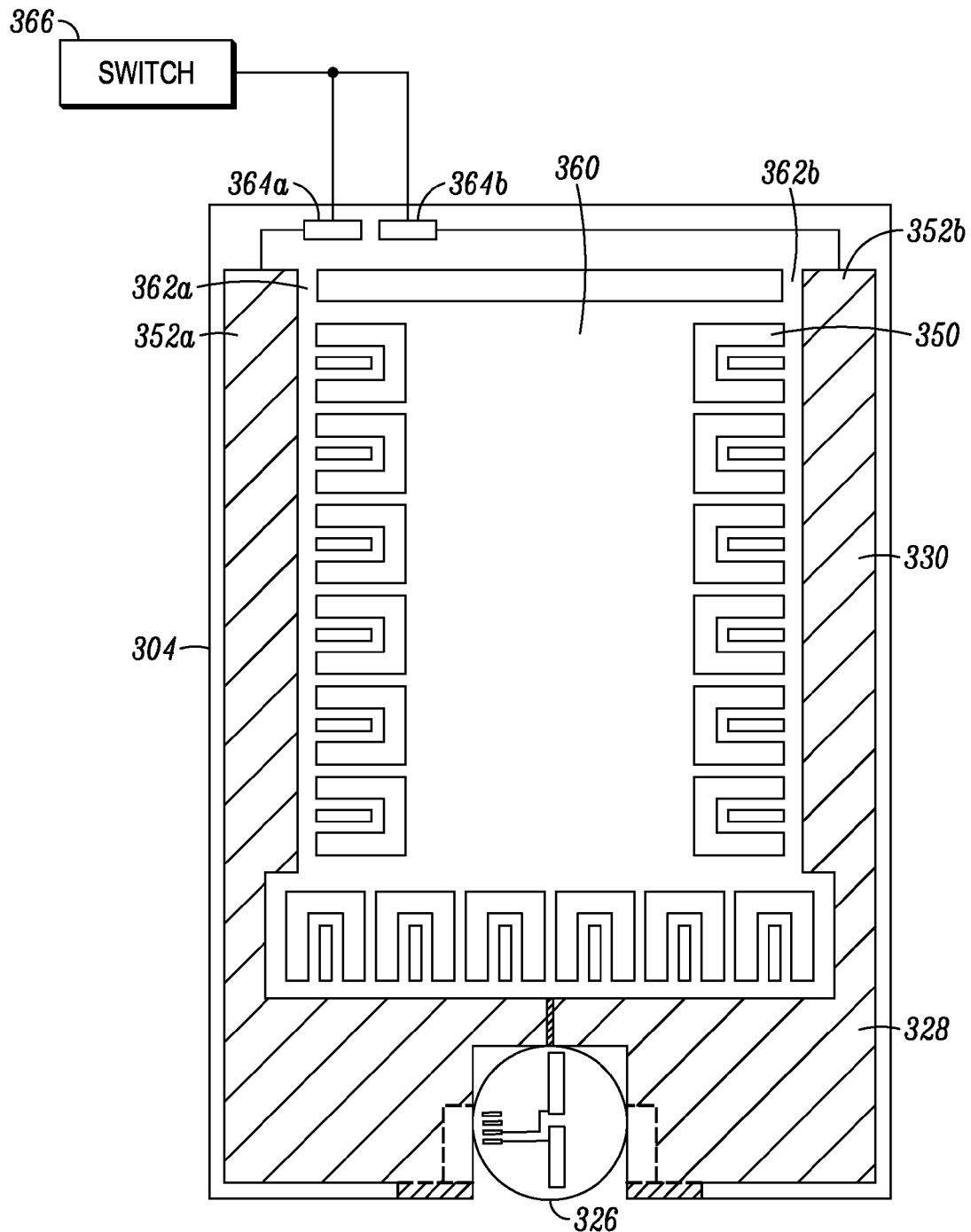
FIG. 3 depicts touch zones or buttons of the disclosed touch screen utilizing a mesh of a low resistivity, and an electrical circuit between the speaker and the controller, including a switchable ground of the electrical circuit.

It may be beneficial to form a mesh-film and plastic combination. Accordingly, the mesh 230 is supported by the film 234 with the flip 106 (see FIG. 1) housing and components may be attached to the combination by for example a heat process such as lamination. In the illustrated embodiment of FIG. 2, the mesh 230 has been deposited on a polyethylene terephthalate (PET) film 234 or any suitable film which was then molded with the flip housing 106 by for example a heat process to form a mesh-film and plastic combination 236. The PET film may have for example, a 0.125 mm thickness. The film 234 may be etched to isolate pattern traces when the mesh 230 is deposited on the film 234. Additionally, a heat process, such as inmold labeling technology, may be applied to form a clear clam shell form factor flip housing. (Pattern traces are depicted in FIG. 3.) Moreover, the circuitry 124 coupled to the flex tail 223 of the previously mentioned PCB may be laminated to the PET film 234 with heat sealing. More specifically, the heat processing may include laminating PCB to the mesh-film and plastic combination 236 to couple the electrical circuit (see FIG. 3) of the translucent electronic device 104 to circuitry of a larger electronic device 102 incorporating the translucent electronic device 104. Accordingly the circuitry 124 may process electrical signals of the electronic component 226, the circuitry being configured to be coupled to a controller 114 of the larger electronic device 102. Heat processes can include less processing than for example, forming a product by an adhesion process.

As mentioned, an electronic component 226, and more particularly a speaker or audio output component is attached to the mesh 230. Also as mentioned above, a heat process, such as inmold labeling technology, may be applied to form a clear clam shell form factor flip 106 (see FIG. 1) housing. An electronic component 226 such as a speaker is applied to the mesh also by a heat process. The leads of the electronic component may be attached to the mesh-film combination by applying heat to the mesh-film and plastic combination. The electronic component 226 has a surface area and has leads (not shown) that are hidden with the area of the electronic component 226. At least a portion of the mesh-film an plastic combination is configured as the electrical circuit (see FIG. 3) which is coupled to the leads of the electronic component within a first area defined by the surface area of the electronic component 226 so that a second area 228 defined outside the surface area of the electronic component 226 is substantially transparent, that is free of any artwork that would cover unsightly circuit leads. Since the mesh is semi-transparent, the electrical connections of a component attached to the mesh appear invisible which makes a semi-transparent touch screen more aesthetically pleasing. In this way, the electronic component or speaker to appears to be floating on the semi-transparent flip, thus maintaining an edge in design trends.

FIG. 3 depicts touch zones or buttons 350 of the disclosed touch screen 304 utilizing a mesh 230 (see FIG. 2) of a low resistivity and an electrical circuit 352a and 352b between the speaker 326 and the controller 114 (see FIG. 1), including a switchable ground 364a and 364b of the electrical circuit 352a and 352b. In one embodiment, the touch screen 304 may include more than eight discrete buttons. In this embodiment, there are eighteen such discrete touch zones 350. As discussed above, the disclosed semi-transparent touch screen device 304 incorporated into a mobile communication 102 (see FIG. 1) such as a clam shell form factor flip is configured so that an adjacent main display screen is visible through the touch screen device. Input received by the touch screen device is responsive to indicia displayed on the display screen. The indicia 108 displayed on the main display screen of the main housing 112 may be configured to correspond to the touch zones 350 so that input received from the touch zones may provide touch signals.

In a mesh 230 (see FIG. 2) the size of a standard flip, in another embodiment, there may be as many as 1024×1024 points or input so there may be a high number of buttons that can be detected since the buttons are virtual. The touch screen is arranged in a 4 column by 3 row configuration. This arrangement creates twelve discrete touch zones but each zone can sense a finger or conductive stylus no matter where the finger or stylus is placed on the screen. A touch screen controller IC (not shown) may be configured so that the four-zone width along a single row can be logically divided into 1024 virtual sections. Each of the four zones along a row may sense an applied finger or stylus.

The sensed resistance increases as the length of the trace increases due to added discrete resistors on the PCB. The touch screen controller IC uses the resistance values to determine where an applied finger or conductive stylus is located along the row, to the resolution of 1024 virtual points. The controller IC may be configured to carry out a similar calculation along the columns for each row or zone to determine the vertical position. In this case the columns have three zones and the controller IC can divide a column into 1024 virtual sections. Therefore, the controller IC can use the twelve zones to calculate a position within a 1024×1024 array. A higher number of touch zones can provide better resolution within a 1024×1024 array. In such an embodiment, the touch screen 104 of FIG. 1 may be a full XY touch screen and having virtual buttons so their number may be limited, for example, by the user interface requirements of the mobile communication device 102. Moreover, the number of touch zones may be dictated by ergonomic considerations, such as the size of the object to touch the touch screen. If fingers of users are to touch the touch screen, the touch zone would be larger than were a conductive stylus used.

The method of forming the touch screen may include configuring a mesh 230 (see FIG. 2) composed of a conductive material having a resistivity less than about 3.0 ohm/mm$^2$ so that at least a portion of the mesh 230 is configured as an electrical circuit. Additionally, forming the touch screen may include depositing on a film 234, the mesh 230 (see FIG. 2), which is then molded to form a mesh-film and plastic combination 236. Moreover, applying by heat, for example soldering, to the mesh-film and plastic combination 236 an electronic component, a speaker 326 having a surface area and having leads (not shown) may be attached to the mesh 230. The leads of the speaker 326 may be within a first area defined by the surface area of the electronic component 326 so that a second area 328 defined outside the surface area is substantially transparent because the mesh 230 is nearly transparent. Moreover, a medallion (not shown) may be applied preferably by a heat process so that the medallion covers top and bottom the speaker 326 to hide the electronics of the electronic component 326. Since the mesh 230 is semi-transparent, the electrical connections 352a and 352b of a component 326 attached to the mesh 230 appear invisible which makes a semi-transparent touch screen more aesthetically pleasing. In this way, the electronic component or speaker 326 appears to be floating on the semi-transparent flip 104 (see FIG. 1), thus maintaining an edge in design trends.

The touch screen region of the mesh-film and plastic combination including buttons or other touch screen capabilities 360 may isolated by fine cuts 362a and 362b from the electrical circuit portion 352a and 352b of the mesh-film and plastic combination. The thickness of the electrical circuit portion 352a and 352b may have a width wide enough to provide an adequate conductance for the speaker component 326. However, since the area 360 of touch sensor traces is close to the electrical circuit traces 352a and 352b of the speaker 326, there may be interference from the speaker circuit when the touch sensor 104 (see FIG. 1) is in use. That is, the speaker 326 audio traces, or the electrical circuit traces 352a and 352b of the speaker 326 may be at a floating voltage when the speaker is not in use, or when the flip 104 is closed. The capacitive touch sensors of the touch screen 106 are used when the flip is closed. The sensitivity of the capacitive touch sensors may be substantially reduced when a floating electrical circuit trace is near the sensor traces. Accordingly, the speaker traces 352a and 352b may be grounded 364a and 364b when the area 360 of the touch sensor 304 is in use. The speaker traces 352a and 352b may be low impedance so that a transistor or other low impedance switch 366 may be used to connect the audio paths 352a and 352b to the device's 102 ground potential 364a and 364b.

A user may use the touch sensor 360 when the flip 104 (see FIG. 1) is in a closed position and may use the speaker 326 when the flip 104 is in the open position. Accordingly, the grounds 364a and 364b are coupled to a switch 366 to activate the switchable grounds 364a and 364b when the flip 106 (see FIG. 1) and the main housing 112 are in a closed position and deactivate the ground when the flip and the main housing are in the open position (not shown). Accordingly, when the flip 106 is open and the speaker 326 is in use, the switch 366 is open allowing the audio driver of the device 102 to send audio signals to the speaker 326. Therefore, the electrical circuit 352a and 352b of the electronic component are switchably grounded so that a grounding switch 366 is controlled by the controller of the larger electronic device. For example, grounding switch module 166 may include circuitry to detect when the flip 106 is opened and closed. The grounding switch module may include one or more sets of prestored instructions to carry out the process of activating and deactivating the ground 364a and 364b.

Disclosed is a translucent touch screen device of a mesh composed of a low resistive material and a method for forming a touch screen and applying components to the touch screen according to a heat based process. More particularly, the disclosed touch screen includes a mesh composed of a low resistive material, such as copper, having pattern traces formed in the mesh, the pattern traces configured to receive input to generate touch signals. The low resistivity of the mesh beneficially allows pattern traces to be of a smaller width than that of the glass-like ITO, and therefore allows more touch zones per specified area than are possible with ITO.

It would be beneficial to make a semi-transparent touch screen more aesthetically pleasing by substantially invisibly attaching to a mesh an electrical circuit of an electronic component, and therefore, rendering artwork to cover electrical connections not necessary. It would be further beneficial were the electronic component a speaker that appeared to be floating on the semi-transparent flip providing advanced features of the semi-transparent flip and maintaining an edge in design trends. It would also be beneficial if a method for forming a touch screen and applying components to the touch screen were, at least in part, according to a heat based process in place of an adhesion process.

Disclosed is a touch screen of mesh that may be utilized by, for example, a mobile communication device. The mesh may be utilized for both a touch screen and an electrical circuit for an electronic component attached to it. That is, the mesh may be in part a touch screen, and in part an electrical circuit. The touch surface includes mesh composed of a conductive material configured to provide input signals from activation points of the touch surface to the control circuit of the device. The mesh also includes an electrical circuit configured to provide audio signals from the control circuit of the device to the speaker. Since the disclosed mesh acts an electrical circuit, an electronic component attached to a mesh has no visible electrical connections, and therefore, rendering artwork to hide electrical circuits from the electronic component to the controller not necessary. Since the mesh is semi-transparent, the electrical connections of a component attached to the mesh appear invisible which makes a semi-transparent touch screen more aesthetically pleasing. Moreover, the speaker appears to be floating on the semi-transparent flip providing advanced features of the semi-transparent flip and maintaining an edge in design trends.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A wireless communication device comprising:
a first housing including a display and a control circuit; and
a second housing adjustable relative to the first housing between an open position and a closed position, the second housing including a touch surface that is positioned substantially parallel to the display of the first housing when the second housing in the closed position and an audio output component, the touch surface has at least semi-transparent properties so that the display of the first housing is viewable through the touch surface when the second housing is in the closed position,
wherein the touch surface includes a mesh composed of a conductive material, the mesh providing audio signals from the control circuit of the first housing to the audio output component of the second housing and input signals from activation points of the touch surface to the control circuit of the first housing.

2. The wireless communication device of claim 1, wherein the mesh composed of a conductive material having a resistivity less than about 3.0 ohm/mm$^2$.

3. The wireless communication device of claim 1, wherein the mesh is composed of copper.

4. The wireless communication device of claim 1, wherein the mesh has been deposited on a film, which is was then molded to form a mesh-film and plastic combination.

5. The wireless communication device of claim 1 having a form factor selected from the group of a clam shell form factor, a rotator form factor, and a slider form factor.

6. The wireless communication device of claim 1, wherein:
   the touch surface includes pattern traces configured to receive input to generate input signals;
   at least a portion of the mesh defines the pattern traces for the touch surface activation points; and
   at least a portion of the mesh defines one or more pattern traces as a circuit for the audio output component.

7. The wireless communication device of claim 6, wherein the circuit for the audio output component includes a switchable ground.

8. The wireless communication device of claim 7, further comprising:
   a switch to activate the switchable ground when the second housing moveable relative to the first housing is in a closed position and deactivate the ground when the second housing moveable relative to the first housing in the open position.

* * * * *